United States Patent Office 3,514,425
Patented May 26, 1970

3,514,425
COMPOSITIONS COMPRISING SILICA AND CO-POLYMERS OF FLUOROETHYLENES WITH ALLYL ALCOHOL
Eugene Herman Engelhardt, Wilmington, Del., assignor to E. I. du Pont de Nemours and Company, Wilmington, Del., a corporation of Delaware
No Drawing. Filed Sept. 29, 1966, Ser. No. 583,072
Int. Cl. C08f *45/04*
U.S. Cl. 260—41                                    10 Claims

ABSTRACT OF THE DISCLOSURE

Described and claimed are copolymers having recurring units of the general formulas

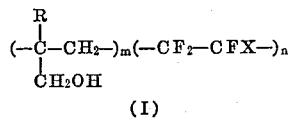

(I)

and

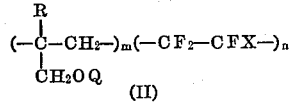

(II)

in which R is H or $CH_3$, X is F or Cl, Q is lower acyl, and $m$ and $n$ represent the number of parenthetical groups present and are in the ratio $m/n$ of 3/1 to 1/2; and complexes of copolymers of Type I in which $m/n$ is 3/1 to 1/2 and polysilicic acid (silica), the copolymer/silica ratio being 90/10 to 10/90. Copolymers of the first formula, which may be prepared from those of the second, are useful in coating compositions.

---

This invention relates to scratch-resistant coating compositions or complexes of copolymers of an allylic alcohol and tetrafluoroethylene or chlorotrifluoroethylene with polysilicic acid. A specific embodiment of this invention is new and useful solid copolymers of allyl alcohol with tetrafluoroethylene.

A combination of polysilicic acid with polymers having a plurality of alcoholic hydroxy groups has been shown in U.S. 2,440,711 to be useful in the preparation of scratch-resistant coatings on plastics such as poly (methyl methacrylate). Recently, the presence of fluorine along with hydroxyl groups has been found to give complexes producing superior coated products, particularly where the alcoholic hydroxyl groups are primary.

From a theoretical point of view, allyl and methallyl alcohols are simple difunctional monomers that contain both a primary hydroxyl group and ethylenic unsaturation and should be readily polymerizable. It has long been recognized, however, that these monomers polymerize only with difficulty and then yield liquid homopolymers of low molecular weight. The polymerization literature demonstrates that allylic compounds do not react as do vinyl compounds, but rather as chain-transfer agents of degradative character preventing the free-radical polymerization that would normally produce solid polymers. The use of moderately elevated pressures (e.g., 8500 kg./cm.²) has been shown by Liable, Chem. Rev. 58, 807 (1958), to affect only slightly the molecular weight of polymers from allyl acetate. Accordingly, even though monoallylic oxy compounds are cheap and readily available, they have not found use in copolymers. Solid polymers that have been produced containing the repeating allyl or methallyl alcohol unit, as shown in U.S. 3,053,790, result from reduction of the ester group of high polymers containing methyl methacrylate or methyl acrylate groups.

It has now been found, in contrast to the teachings of the polymerization art, that high molecular weight copolymers of varying ratios can be obtained from the free radical-initiated polymerization of an allylic alcohol or ester with tetrafluoroethylene or chlorotrifluoroethylene. The production of the present solid copolymers by direct copolymerization can be represented by the equation:

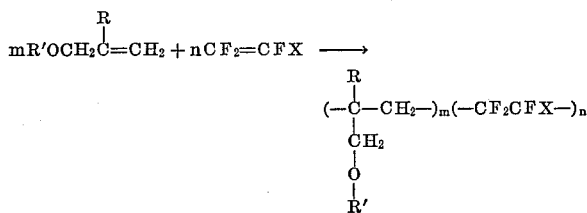

wherein R is H or $CH_3$, R' is H or lower acyl (Q) of up to 4 carbons such as acetyl, X is F or Cl and the ratio of $m/n$ is generally from about 3/1 to 1/20. These copolymers react with polysilicic acid to form coating complexes. Particularly preferred for use with polysilicic acid in forming coating complexes according to the present invention are copolymers of allyl alcohol with tetrafluoroethylene where the $m/n$ ratio is in the range 3/1 to 1/2.

Although the hydroxyl copolymers as obtained directly from allylic alcohols are preferred, ester groups (e.g., as derived from allyl acetate or methallyl acetate) are also available by direct copolymerization. The latter can be converted to alcoholic hydroxyl by saponification or alcoholysis procedures. These preferred allylic alcohol copolymers obtained directly or from esters can be represented by the formula

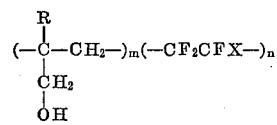

where R is H or $CH_3$, X is F or Cl and the $m/n$ ratio is 3/1 to 1/20. When the $m/n$ ratio is from 1/1 to 1/20, the high molecular weight copolymers are useful for adhesives, films, fibers and molded applications. They can also be reacted with reagents such as diisocyanates, diacids, polyaldehydes, melamine, etc., that crosslink through reaction with the active primary hydroxyl groups to give insoluble and heat-resistant products.

When the $m/n$ ratio of the preferred formula, above, is from 3/1 to 1/2, i.e., the ratio of chlorotrifluoroethylene or tetrafluoroethylene to allyl alcohol or methallyl alcohol is between 1/3 and 2/1, the high molecular weight polymers of this invention are particularly valuable in combination with polysilicic acid to form solutions useful to form transparent, clear, scratch-resistant coatings which adhere well to a variety of substrates. These coating compositions generally contain 10–90 parts by weight of polysilicic acid (calculated as $SiO_2$) and 90–10 parts of the copolymer. The allyl alcohol copolymer appears to provide superior adhesion and resistance of the coating to attack by water or aqueous alkali. Particularly useful are copolymers of tetrafluoroethylene with allyl alcohol and coating compositions that contain 20–40% silica (as $SiO_2$) and 80–60% of the copolymer.

These novel polymers are obtained by the copolymerization of tetrafluoroethylene or chlorotrifluoroethylene with an allyl or methallyl alcohol or ester of a lower aliphatic monocarboxylic acid. The conditions for the polymerization require a free radical polymerization catalyst and liquid phase. The pressures used are superatmospheric to provide sufficient concentration of the perhaloethylene at the elevated temperatures, with pressures of generally 100–3000 p.s.i. being readily available and most useful. Higher pressures can be used, but are not essential for the copolymerization process.

The exact polymerization conditions can be varied depending on the ratios desired in the copolymers. In general, the perhaloethylene is present in excess amounts on a weight basis. The weight ratio of chlorotrifluoroethylene or tetrafluoroethylene to allylic alcohol or ester is generally 1/1 to 10/1. During polymerization in a batch process, the ratio of monomers may vary at different times. A continuous polymerization offers advantages in maintaining substantialy constant ratios throughout the polymerization interval and can result in greater homogeneity of the copolymers.

The catalysts used are free radical initiators, generally of the peroxy or azo types. The catalysts are generally present in amounts of about 0.1–5% by weight based on the monomers used. The catalysts are preferably those that are effective at temperatures of 50–150° C. and the combination of catalyst and temperature is selected such that they produce free-radicals, i.e., have a relatively short half-life under the conditions selected.

It has been found that elevated temperatures, e.g., 100–140° C., produce higher yields of the desired solid copolymers. Under these conditions, substantially no polymer is former when the fluoroethylene is omitted. The substitution of ethylene for the fluoroolefin gives a low yield of low viscosity oils. Accordingly, the coaction of tetrafluoroethylene of chlorotrifluoroethylene is unique in that unexpectedly there are formed the new copolymers of high molecular weight that have substantial amounts of each monomer unit. Contrary to expectations from study of the polymer art, the allyl monomer does not inhibit the copolymerization and the system must have an unusual coaction of the specific monomers. Unexpectedly, increased conversions are obtained when the temperature of polymerization is increased. Furthermore, higher molecular weight copolymers generally result under the same conditions. For example, with di-tert-butyl peroxide at 120–140° C., the copolymer is obtained in higher yields and with higher molecular weight than at lower temperatures even with catalysts more active at reduced temperatures.

The time of polymerization is dependent upon temperature, concentration of monomers, and exact conditions used. In a continuous reactor the exact polymerization time is probably very short. Generally, times from a few minutes to several hours are used.

The separation and isolation of the copolymer obtained makes no unusual requirements. The use of water, particularly hot water or steam, serves to remove monomer or any low molecular weight allyl homopolymer present. The new copolymers are water-insoluble.

The new copolymers are nonliquid, i.e., solid and of high molecular weight, with a degree of polymerization of at least 50 and generally 100 or more of monomer units as measured by optical methods and viscosity. The properties are due to the presence of both recurring difluoromethylene units ($CF_2$) and primary hydroxyl or ester thereof directly attached to chain carbon, e.g., —$CH_2OH$. The primary hydroxyl provides a reactive group in the otherwise generally inert recurring units. When the ratio of the polyfluoroethylene to allylic alcohol units is as high as 20/1, the copolymer differs from homopolymers of the polyfluoroethylene in several significant properties. The copolymers have different solubility and reactivity. The copolymers when treated with reagents reactive with primary alcoholic hydroxyl form new derivatives. For example, polyisocyanates react to give polyurethanes with new properties of solubility, thermal resistance, etc. This reaction can be conducted on preformed readily obtained objects such as films by treatment with a crosslinking reagent. For molded objects, fibers, films, etc., with or without crosslinking or subsequent reaction, the ratio of polyfluoroethylene to allylic unit is generally from 20/1 to about 1/1.

When the ratio is about 2/1 to 1/3, i.e., when the amount of allylic unit is relatively high, the primary alcohol-containing polymers are useful in combination with polysilicic acid to produce hard scratch-resistant coatings. High allylic alcohol content in the copolymers increases their compatibility with polysilicic acid.

The polysilicic acid employed for coating applications with the allylic alcohol/tetrafluoroethylene or chlorotrifluoroethylene copolymers is readily available. For example, ethyl silicate (tetraethyl orthosilicate) is a commercial product. It is soluble in organic solvents and readily hydrolyzed by water to a useful soluble polysilicic acid. By use of varying amounts of water, the exact degree of hydrolysis can be varied. A compatible solvent system is a lower alcohol, particularly ethanol. A general formula for the preparation of the polysilicic acid solutions (15% $SiO_2$) is 100 parts of ethyl silicate (92–X) parts of ethanol or similar diluent where X is the amount of water or preferably 0.1 N hydrochloric acid. In general, X is preferably about 22.5 to 45. When X is 18 or less, the hydrolysis of ethyl silicate is insufficient to give a good polysilicic acid for use in this invention, unless further hydrolysis is brought about in the coating solution or process. Although more water can be used, i.e., X is up to 50 or more, such large amounts are generally not necessary and may affect adversely the compatibility with the organic copolymers used.

Solvents useful for the preparation of coating compositions depend on the polymeric materials employed, substrate, and other factors such as evaporation rate, etc. It is usually desired that the solvent have appreciable vapor pressure at below 100° C. and preferably boil below about 100–125° C. The solvent system should be compatible with the ingredients in a wide range of proportions. Useful solvents include particularly lower alkanols (e.g., methanol, ethanol, propanols, butanols) and mixtures of alkanols with lower (1–3 carbon) alkanoic acids. Halogenated solvents, e.g., trichloroethylene, can be employed. Adjuvants, such as small amounts of Cellosolve® derivatives, are useful as antihaze agents.

The addition of small amounts (0.05–5%, based on weight of polysilicic acid/polymeric allylic alcohol) of a block copolymer of mixed lower alkylene (2–4 carbon) oxides with dimethyl siloxane promotes even spreading and drying of the coating solution to form thick even coatings. Particularly preferred block copolymer adjuvants are those having units from both polyethylene oxide and polypropylene oxide and a dimethyl silane content of 20–25% as described in French Pat. 1,330,956 or U.S. 3,172,899. The use of the organosilicones in silica/polymeric alcohol coating solutions is described in my copending, coassigned application Ser. No. 464,184, filed June 15, 1965.

The solution which generally has a viscosity of 10–300 cps. can generally be used in coating for several weeks after preparation, particularly if care has been taken to employ relatively pure ingredients and compatible solvents and additives. The solutions can be applied to the surfaces to be protected (e.g., painted surfaces, glass, wood, etc.) by known methods such as flowing, spraying, doctoring, gravure roll, dipping, etc. For spray applications or rapid withdrawal rates from baths, the viscosity is generally lower than for flowing or dipping using slow withdrawal rates. The solids content and viscosity are generally in direct proportion to the thickness desired in the final film. For example, with a solution of solids content of 20%, an initial thickness of solution layer should be about 35µ to give a final solvent-free coating of about 5µ. Solvents generally include both the lower alkanols and alkanoic acids such as 1–5 carbon alkanols and 1–3 carbon alkanoic acids. These are particularly preferred since they are compatible with the silicic acid which generally is an aqueous alcohol solution. The solvent is removed preferably by evaporation generally at elevated temperatures to ensure its rapid and complete removal.

After removal of the solvent, the coating is either heated for some time (e.g., 90° C. for 15 hours or 170° C. for ½ hour) or held for several days at room temperature to allow the coating to cure to the hard, abrasion-resistant layer desired. In general, the higher the silica content of the layer, the lower the temperature required for curing.

The silica-containing product formed in this invention has

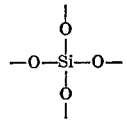

units with at least one oxygen attached to another silicon and with 0 to 2 (average less than 1) other oxygens attached to the carbon of a hydroxy aliphatic fluorine-containing polymer via condensation, any oxygens not satisfied by such bonds, being attached to hydrogen. The ultimate hard structure is thus thought to consist of two coextensive compatible transparent structures, one of a tough linear polymer chemically bonded at several points to a hard, three-dimensional

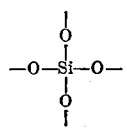

network. In other words, the structure can be pictured as a macromolecular (nonparticulate) reinforcement of the essentially linear organic polymer or as a plasticization of a hard polyfunctional condensation polymer (polysilicic acid) with a tough linear organic polymer. It may thus be regarded as an interlocking copolymer or complex of silica and the preformed copolymer.

The silica-containing complexes of this invention provide insoluble, inert, abrasion-resistant finishes that are also resistant to aqueous alkaline conditions. Polymeric materials coated with the new complexes are useful in the fabrication of flat or curved plastic enclosures, such as windows, windshields, lenses, etc. The silica-containing allylic alcohol/chlorotrifluoro- or tetrafluoroethylene complexes are useful for coating paints, enamels and metal surfaces.

The following examples in which the parts are by weight unless otherwise specified further illustrate the preparation and use of the new copolymer compositions.

EXAMPLE 1

(A) Tetrafluoroethylene/allyl acetate and tetrafluoroethylene/allyl alcohol copolymers (4/3)

The folowing was charged into a shaker tube of 400 ml. capacity:

200 ml. of water
40 g. of allyl acetate
0.35 g. of α,α'-azodiisobutyronitrile
60 g. of tetrafluoroethylene The tube and contents were heated for five hours at 75° C. and nine hours at 80° C. at a pressure of 2000 p.s.i. The polymer was a taffy-like solid insoluble in the polymerization medium. The liquid was decanted and the polymer was washed and then dried by high vacuum at room temperature for 48 hours. There was obtained 37 g. of a white solid having an inherent viscosity of 0.14 measured at 25° C. for a 0.1% solution in dioxane. The polymer contained 43.98% F corresponding to a molar ratio of allyl acetate/tetrafluoroethylene of 3/4.

About 30 g. of the above polymer placed in a flask with agitator and condenser, 75 g. of dioxane was added and the polymer was dissolved, then 38 g. of anhydrous methanol containing 0.15 g. of sodium methoxide was added and the reaction mixture heated to slowly remove methyl acetate. After four hours, 30 g. of methanol was added and heating continued for eight hours. Very little C=O absorption was present in the infrared spectrum, the latter having strong hydroxyl absorption. The allyl alcohol/tetrafluoroethylene copolymer (24.1 g.) was a hard white solid, soluble in ethanol and dioxane, with an inherent viscosity of 0.17 and a fluorine content of 50.7%.

(B) Coating composition of polysilicic acid/tetrafluoroethylene/allyl alcohol copolymer A coating solution was prepared as follows:

57.2 g. of an ethanol solution containing 15 g. of the allyl alcohol copolymer of A
45.5 g. of an ethanol solution of polysilicic acid (6.82 g. of silica calculated as $SiO_2$ obtained by the general procedure of hydrolysis of ethyl silicate by addition of 45 parts of 0.1 N hydrochloric acid to 100 parts of ethyl silicate in 47 parts of ethanol)
10 g. of n-butyl alcohol
0.124 g. of potassium thiocyanate.

Poly(methyl methacrylate) panels were dipped into the solution, and after two minutes withdrawn vertically at a rate of 12"/min., followed by heating for 30 minutes at 170° C. The clear transparent coating obtained had excellent adhesion and was resistant to scratching by steel wool and to the Taber Abrader (American Standards Association Test Z26.1 1–1950). It was resistant to solvents and aqueous alkaline cleansers.

EXAMPLE 2

(A) Tetrafluoroethylene/allyl acetate and tetrafluoroethylene/allyl alcohol (3/4)

The following was charged into a 400-ml. pressure tube:

100 g. of water
100 g. of t-butyl alcohol
0.3 g. of benzoyl peroxide
35 g. of allyl acetate
60 g. of tetrafluoroethylene The tube and contents were heated at 80° C. under 2000 p.s.i. for 12 hours. The aqueous layer was decanted. The polymer was a white tacky solid with a taffy-like consistency. The polymer was dissolved in methylene dichloride and entrained water separated. The solvent was stripped from the polymer is a rotating flash evaporator. The product which was a water-white, taffy-like solid weighted 45 g., had an inherent viscosity of 0.15 and contained 32.14% fluorine corresponding to a molar ratio of allyl acetate to tetrafluoroethylene of 4/3.

To a flask equipped with stirrer and condenser was added 40 g. of this polymer dissolved in 100 g. of dioxane and 50 g. of methanol containing 0.2 g. of sodium methoxide. The mixture was heated to remove the methyl acetate. After four hours 40 g. more of methanol was added and heating continued for another four hours. Infrared spectrum at this time indicated only a slight amount of C=O in the polymer. The polymer was precipitated by addition of cold water, washed and then dried at 60° C. in a vacuum oven for 18 hours. The hard, white solid copolymer (28.5 g.) had an inherent viscosity of 0.17 and contained 41.8% of fluorine.

(B) Coating composition

A coating solution was prepared containing:

30.0 g. of polysilicic acid (4.5 g. $SiO_2$) in ethanol (see example 1–B)
54 g. of a methanol solution of 18 g. of the allyl alcohol copolymer of A above
12 g. of n-butyl alcohol
24 g. of acetic acid
0.046 g. of silicone ("L–520" Union Carbide and Carbon, a block copolymer of alkylene oxides with dimethyl silane)

Poly(methyl methacrylate) panels were dipped into the above solution for two minutes, withdrawn vertically at 12″/min., and baked for 30 minutes at 170° C.

The optically perfect transparent coatings, of about 3.5 microns thickness, had excellent adhesion to the substrate and good-to-excellent abrasion resistance by steel wool. Resistance to alkali attack was excellent.

To the above coating solution was added an additional 10 g. of the polysilicic acid solution giving a $SiO_2$/polymer ratio of $SiO_2$/polymer of 25/75. Coated panels were prepared in the manner detailed above. The optically perfect coatings (about 3.5 microns thick) were of excellent abrasion resistance and adhesion to the substrate. Alkali resistance was excellent.

To the preceding coating solution was added an additional 10 g. of polysilicic acid solution to give a composition of about 29.7 $SiO_2$/70.3 polymer. Coatings prepared as described above were optically perfect (4.3 microns thick) and were superb steel wool and Taber scratch resistance and adhesion. Aqueous alkali resistance, hot water resistance, and adhesion were excellent with no optical defects. Solvent resistance was excellent.

To the solution of the preceding paragraph was added 17.7 g. of the polysilicic acid solution to give 37.5/62.5 $SiO_2$/polymer. Panels dipped and baked as described (3.16 microns thick) were found to be generally similar to those of the preceding.

EXAMPLE 3

(A) Tetrafluoroethylene/allyl alcohol copolymer (1/1.85)

To a pressure tube of 400-ml. capacity was introduced:

150 g. of t-butyl alcohol
0.1 g. of $NaH_2PO_4 \cdot H_2O$
1.2 g. of $Na_2HPO_4 \cdot 7H_2O$
20 g. of allyl alcohol
0.2 g. of $\alpha,\alpha'$-azobis($\alpha,\gamma$-dimethylvaleronitrile)
50 g. of tetrafluoroethylene The vessel was heated to 50 to 60° C. for 16 hours at a pressure of 200 p.s.i. The polymer was recovered by removing the solvent in a rotary evaporator. The product was washed and dried under vacuum for 16 hours. There was obtained 4.6 g. of solid which had 36.9% fluorine corresponding to a ratio of 1.85 allyl alcohol/1 tetrafluoroethylene. The inherent viscosity was 0.02.

(B) Coating composition

The following coating solution was prepared (69.5 polymer/30.5 $SiO_2$):

10 g. of a solution containing 8 g. of methanol and 2 g. of the above polymer
5.88 g. of an ethanol solution of polysilicic acid (15% $SiO_2$)
1 g. of n-butyl alcohol
1 drop of silicone "L–520" (see Example 2–B)

The composition was used to coat poly(methyl methacrylate) panels as described above. The coatings (3–4 microns thick) were clear, hard and scratch-resistant. They had excellent adhesion initially as well as after exposure to water at 60° C.

EXAMPLE 4

Tetrafluoroethylene/allyl acetate and tetrafluoroethylene/allyl alcohol (3/1) copolymers To a 400-ml. pressure tube was added 100 ml. of t-butyl alcohol, 200 ml. of water, 0.1 g. of di-t-butyl peroxide, 15 g. of allyl acetate and 60 g. of tetrafluoroethylene. The tube was sealed and heated for 8 hours at 130° C. The developed pressure ranged from 1350 p.s.i. down to 250–300 at the end of 8 hours.

The polymer formed was a slightly off white taffy-like mass. Residual monomer and solvents were removed by steaming for about ¼ hour to give a tough, white product which was washed in a blender. It was dried by heating to 50° C. in high vacuum for 16 hours. There was obtained 60 g. of polymer having a fluorine content of 54.68% corresponding to a tetrafluoroethylene/allyl acetate ratio of about 3/1. Infrared showed virtually no OH and strong carbonyl. The inherent viscosity was 0.16; refractive index, 1.410; 5% weight loss (thermogravimetric analysis) at 371° C.; glass transition temperature (Tg) of 9° C.; and a melting temperature (Tm) of about 158°. Molecular weight by light scattering was 210,000 but by vapor phase osmosis was 7070.

To 100 parts of dioxane (anhydrous) was added 50 parts of the above polymer. Solution occurred on rolling the mixture for 16 hours. To the above milky solution was added (in a 3-neck flask reactor fitted with agitator, condenser and nitrogen inlet) 50 parts of methyl alcohol and 0.1 part of sodium methoxide. The mixture was agitated and heated to remove methyl acetate. After five hours, an additional 20 parts of methyl alcohol and 0.05 part of sodium methoxide were added. The reaction was carried out for an additional three hours. The material was precipitated in cold water and washed. The white granular solid polymer was dried under vacuum at 50° C. for 16 hours to give 29 parts of polymer having a fluorine content of 61.7% and an inherent viscosity of 0.15. Infrared analysis showed the presence of —OH and only a slight amount of carbonyl. Refrective index was 1.420. The polymer exhibited a 5% weight loss at 401° C. and a glass transition temperature of about 49° C.

EXAMPLE 5

Tetrafluoroethylene/allyl alcohol (1/1) copolymer

To a pressure-resistant tube of 400–ml. capacity was introduced:

215 ml. of water
100 ml. of t-butyl alcohol
20 g. of allyl alcohol
0.2 g. of di-t-butyl peroxide
60 g. of tetrafluoroethylene The tube and contents were heated to 130° C. for eight hours with the pressure varying from 3000 p.s.i. down to 900 p.s.i. The product obtained was subjected to steam distillation for ½ hour, after which the viscous mass was washed with cold water. A brittle, hard, off-white solid polymer resulted. The material was washed in a blender and dried in a vacuum oven for 64 hours at room temperature. There was obtained 29 g. of a 1/1 copolymer having 46.17% fluorine and an inherent viscosity of 0.16. The polymer was moderately soluble in alcohols, dioxane, and similar solvents. The infrared spectrum showed the presence of pendant hydroxyl groups. The polymer had a refractive index of 1.416; 5% weight loss at a temperature of 325° C.; glass transition temperature of about 19° C.; and a melting temperature of about 250° C.

About 2 g. of the above copolymer was dissolved in dioxane to form a 25% solution. To this was added 0.4 g. of toluene diisocyanate and a film cast on a sheet of polytetrafluoroethylene. After drying at room temperature, the film was heated to 140° C. for about 5 minutes to facilitate reaction. The film did not melt when heated to above about 350° C. on a hot plate whereas a control to which no diisocyanate was added rapidly melted at this temperature.

EXAMPLE 6

Tetrafluoroethylene/allyl acetate and tetrafluoroethylene/allyl alcohol (1/1)

To a 400-ml. pressure vessed was added:

100 ml. of t-butyl alcohol
200 ml. of water
0.1 g. of di-t-butyl peroxide
35 g. of allyl acetate
60 g. of tetrafluoroethylene The tube was sealed and heated for 8 hours at 130° C. Pressure developed varied from about 2500 p.s.i. initial to final of about 400 p.s.i. The product was steamed for ½ hour to remove unreacted monomer. The white solid obtained was washed in a blender and dried in high vacuum at 40° C. for 16 hours. The water-white solid (70 g.) had an inherent viscosity of 0.2 and a fluorine content of 37.8% corresponding to a ratio of tetrafluoroethylene/allyl acetate of about 1/1. Infrared showed strong carbonyl but substantially no hydroxyl absorption. The polymer had a refractive index of 1.420, molecular weight by light scattering of about 45,000, a glass transition temperature of about 1° C., and lost 5% weight at about 390° C. (TGA—5%).

The polymer from a combination of several similar preparations as above was hydrolyzed as follows: 2600 g. of a 33⅓% solution of the polymer in dioxane, 500 g. of methanol, and 1.0 g. of sodium methoxide were stirred and heated to slowly distill off methyl acetate. After four hours, another 400 g. of methanol and 0.5 g. of sodium methoxide were added. The reaction was stopped after a total of eight hours. The polymer was precipitated by cold water, washed and then dried for 64 hours in a vacuum oven at 40° C. The white powder (680 g.) had a fluorine content of 46.4% and inherent viscosity of 0.11. Infrared showed a large amount of hydroxyl and only a slight carbonyl content. The polymer had a refractive index of 1.430, glass transition temperature of 21–35° C. and had a 5% weight loss at 340° C.

To a solution of 3 g. of the latter polymer in 6 g. of ethanol was added 60 g. of a 15% polysilicic acid (as $SiO_2$) solution in ethanol, 20 g. of acetic acid and 2 drops of the silicone described in Example 2(B). The resulting solution was coated on poly(methyl methacrylate) sheeting and heated for 30 minutes at 150° C. The coating (75/25 $SiO_2$/polymer) was adherent and scratch resistant.

EXAMPLE 7

Tetrafluoroethylene/methallyl alcohol copolymer

To a 400-ml. reaction vessel was introduced:

190 ml. of water
95 ml. of t-butyl alcohol
0.2 g. of di-t-butyl peroxide
20 g. of methallyl alcohol
60 g. of tetrafluoroethylene The closed vessel was heated to 130° C. for eight hours with a pressure range of from 1630 to 1025 p.s.i. The aqueous layer was decanted and the polymer isolated by steam distillation. A hard, brittle, off-white solid resulted after drying in a vacuum oven for 16 hours at 40° C. There was obtained 17.4 g. of polymer having a 42.07% fluorine (corresponding to a methallyl alcohol/tetrafluoroethylene ratio of 1.1/1) and an inherent viscosity of 0.03.

EXAMPLE 8

Chlorotrifluoroethylene/allyl acetate 1.2/1 and chlorotrifluoroethylene/allyl alcohol 1.2/1

T a 400-ml. pressure vessed was added:

195 cc. of water
95 cc. of t-butyl alcohol
0.3 g. of di-t-butyl peroxide
30 g. of allyl acetate
55 g. of chlorotrifluoroethylene The tube was sealed and heated for 8 hours at 130° C. Pressure developed varied from about 200 p.s.i. maximum to a final 120 p.s.i. The product was steamed for ½ hour, resulting in a sticky solid polymer. The white solid was dried in vacuum at 40° C. for 16 hours. The solid (67.1 g.) had an inherent viscosity of 0.06 and contained a mole ratio of 1.2 chlorotrifluoroethylene/1.0 allyl acetate.

To 60 g. dioxane in a 300-cc. flask was added 30 g. of the above polymer. After solution, 80 g. methanol and 0.5 g. sodium methoxide were added. The mixture was heated for 6 hours to slowly drive off methyl acetate. The reaction was stopped by addition of the solution to ice water. The resulting yellow, solid chlorotrifluoroethylene-allyl alcohol copolymer (19.4 g.) was found to contain a large concentration of hydroxyl groups and only a trace of carbonyl (by IR).

The methallyl alcohol copolymer of Example 7 is also particularly useful in formation with polysilicic acid to give coating compositions. Likewise in the examples when chlorotrifluoroethylene is substituted for tetrafluoroethylene, corresponding copolymers are obtained which are useful for the same products.

Since obvious modifications and equivalents in the invention will be evident to those skilled in the chemical arts, I propose to be bound solely by the appended claims.

The embodiments of the invention in which an exclusive property or privilege is claimed are defined as follows:

1. Solid copolymers of the formula

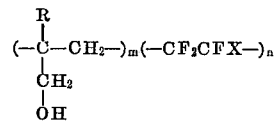

wherein R is H or $CH_3$, X is F or Cl, and the ratio $m/n$ is in the range 3/1 to 1/20.

2. Solid copolymers of claim 1 wherein R is H and X is F.

3. Solid copolymers of claim 2 wherein the $m/n$ ratio is between about 3/1 and 1/2.

4. Copolymers useful in producing the copolymers of claim 1 having the formula

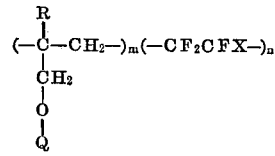

wherein R, X, and the $m/n$ ratio are as in claim 1 and Q is lower acyl.

5. A complex of (1) a copolymer of claim 1 wherein the $m/n$ ratio is between about 3/1 and 1/2, and (2) silica, the copolymer/silica ratio being in the range 90/10 to 10/90.

6. A complex of claim 5 in liquid solution.

7. A complex of claim 5 in solid form.

8. A complex of claim 5 wherein the copolymer is a copolymer of allyl alcohol and tetrafluoroethylene.

9. A solid manufacture coated with the complex of claim 8.

10. A solid manufacture formed from poly(methyl methacrylate) and coated with the complex of claim 8.

References Cited

UNITED STATES PATENTS 2,424,838  7/1947  Moffett et al. _____ 260—87.5
2,440,711  5/1948  Bechtold _____ 117—72
2,479,367  8/1949  Joyce et al. _____ 260—87.1

OTHER REFERENCES

Schildknecht, Calvin E.: "Vinyl and Related Polymers," John Wiley & Sons, Inc., New York, 1952, pp. 484–486.

Manno, P. J.: "Search for New Fluoropolymers," Nucleonics, vol. 22, June, 1964, pp. 64–67.

MORRIS LIEBMAN, Primary Examiner

J. H. DERRINGTON, Assistant Examiner

U.S. Cl. X.R.

260—87.1, 87.5, 827, 33.4, 33.8